Sept. 21, 1965  B. READ  3,206,919
HARVESTING DEVICE
Filed Nov. 23, 1962

INVENTOR.
Balfour Read
BY
Dale A. Winnie
ATTORNEY

United States Patent Office 3,206,919
Patented Sept. 21, 1965

3,206,919
HARVESTING DEVICE
Balfour Read, 8488 Center Road, Traverse City, Mich.
Filed Nov. 23, 1962, Ser. No. 239,437
6 Claims. (Cl. 56—328)

This invention relates to harvesting devices in general and more particularly to apparatus for shaking a fruit bearing tree or limb to dislodge the fruit and enable easier harvesting thereof.

Orchard farmers have long had a problem in harvesting the fruit from their trees. The perishable nature of most fruit requires that it be picked with reasonable care and as soon as it is ripe. In the past this has been done largely by legions of fruit pickers with the attendant problems of temporary housing, increasing pay scales, and growing labor and management problems.

A number of orchard farmers have tried to use mechanical devices for shaking trees in the harvesting of their crops. However, so far existing means have not been entirely successful.

In general, mechanical harvesting devices make use of some means for shaking a tree, or a limb of a tree, to dislodge the fruit which is then picked up off the ground or caught in canvas sheets or the like placed under the tree. Such equipment when properly operated does not damage the tree and the process merely accelerates nature's own method with no significant damage to the fruit itself.

Unfortunately, most mechanical harvesting devices which are in present use are quite complicated and are accordingly quite expensive. Most of these are specially designed and built self-contained units including their own self propelled vehicle, cable reels, power operated booms, and the like. Needless to say, only the larger orchards can afford such equipment, particularly when one realizes that the equipment sits idle except for the relatively short harvesting season.

Many of the smaller orchards have used accessory devices with their own tractors or have improvised some form of tree shaking device which suits their own purposes. In the process they have damaged many of their trees and have suffered the future loss of part of their crop; not to mention having had their farm equipment tied up and their own time occupied when needed for other purposes.

It is an object of this invention to provide a suitable mechanical device for harvesting the fruit from orchard trees and the like.

One of the objects of this invention is to provide a mechanical harvesting device which is simple in construction and operation.

Another object of this invention is to provide a harvesting device which is economical in construction, includes a minimum number of parts subject to damage or failure and is accordingly easy and economical to maintain and service.

A further object of this invention is to provide a harvesting device including means for shaking a tree or limb without damage thereto and without reactionary damage or disruption of the operation of the equipment itself.

It is also an object of this invention to provide a mechanical harvesting device including means for shaking a tree or limb at a high frequency or with relatively small amplitude.

A still further object of this invention is to provide a reciprocating means for shaking a tree or limb and one which is inclusive of means for varying the intensity and frequency of such motion for more suitable use with trees of different sizes.

As will subsequently be appreciated, the harvesting device of this invention includes no hydraulic, compressed air or other power applicator means so frequently subject to malfunctioning.

The mechanical harvesting device of this invention may be provided as a self-contained unit having its own power source or as one adaptable for one power take-off connection with a tractor or other drive source.

These and other objects and advantages in the practice of this invention will be more apparent upon the reading of the following specification in regard to a preferred embodiment and which has reference to the accompanying drawing.

Figure 1:
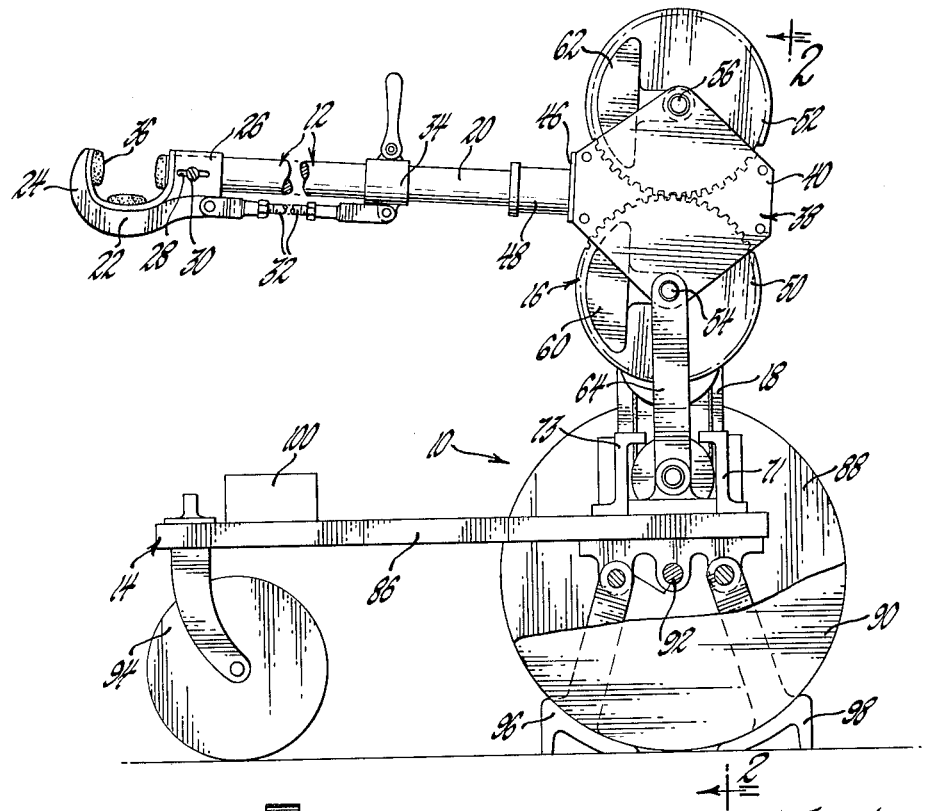
FIGURE 1 is a side elevational view of a mechanical harvesting device including the improvement features of this invention and having parts cut away.
Figure 2:
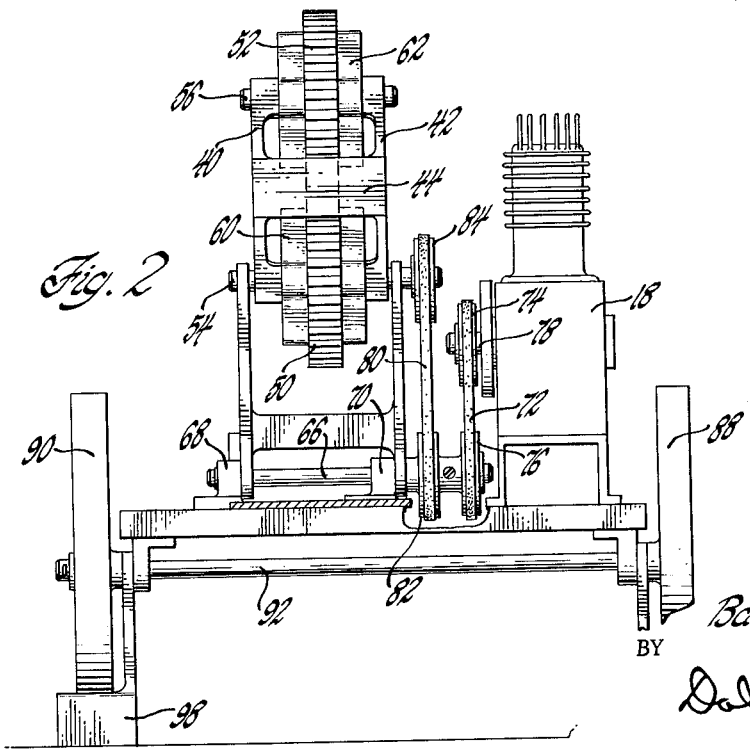
FIGURE 2 is a rear elevational view of the piece of equipment shown by FIGURE 1 as seen in the plane of line 2—2 and looking in the direction of the arrows thereon.

The harvesting device 10 shown by the drawing includes a tree or limb engaging boom member 12 which is provided on a carriage member 14. An operative mechanism 16 is provided on the boom 12 and is adapted to reciprocate the boom back and forth in a manner which will subsequently be described. The boom reciprocating mechanism 16 is connected to a drive power source which, in the present instance, is a gasoline engine 18.

It will be appreciated that the harvesting device 10 may be operated either by a drive power source which is mounted on the carriage 14, as shown, or by a power take-off connection from a tractor or the like. The means used to drive or power the operative mechanism 16 which causes reciprocation of the boom 12 is considered incidental to the present invention and is accordingly described later only in general terms.

The boom 12 is an elongated tubular member 20 and is preferably of such length as will enable the harvesting device 10 to be disposed at some distance from the tree or limb which is to be engaged and shaken. In this regard it should be appreciated, although not shown, that the boom 12 may be telescopic or otherwise extendable. Since such innovations are commonly known and recognized by those familiar with this type of equipment they have not been illustrated. Furthermore, as will subsequently be appreciated, the present invention relates principally to means for reciprocating a tree or limb engaging member, generally in the broad sense, and while such means are shown as used with a boom member of fixed length, no limitation is intended in respect thereto. It is principally the means by which the reciprocating force is obtained that is of significance and the application thereof to any suitable tree or limb engaging means follows naturally.

A tree limb or trunk engaging claw member 22 is provided on the end of the boom 12. It includes a fixed jaw or hook member 24 provided on a sleeve 26 which is adjustable on the end of the boom 12. A guide slot 28 provided in the sleeve 26 and a guide screw 30 engaged to the boom provides for longitudinal adjustment of the claw 22 on the end of the boom.

As will be appreciated, adjustment of the jaw or hook end 24 relative to the end of the boom which extends through the sleeve 26 enables retaining engagement with a tree limb or trunk. Such adjustment is afforded by a connecting link 32 which is connected to the claw 22 and to a sliding clamp 34 provided on the boom at a remotely disposed position.

Suitable pads 36 are provided on the face of the jaw member 24 and end of the boom 12 to minimize tree damage in the engagement and subsequent actuation of the tree or limb.

The operative mechanism 16 which induces reciprocation of the boom 12 is provided within a suitable housing 38 to which the boom is secured. In the present instance the housing 36 is represented by a pair of parallel spaced plate members 40 and 42. This provides an open housing having only the spacing end plates 44 and 46; with the boom 12 being secured to a suitable fitting or collar 48 provided on the latter and enabling the boom to be twisted as necessary for the claw 22 to grasp the tree branch at any angle.

A pair of spur gears 50 and 52 are mounted on axle shafts 54 and 56 provided between the housing side plates 40 and 42. The two gears are of the same diameter and have the same diametral pitch. Further, the point of tangency of the pitch circles of the mating gears, that is the pitch point, is disposed coincident with the longitudinal axis of the boom 12.

It will be further noted that each of the gears 50 and 52 have comparable eccentrically disposed masses 60 and 62. Such eccentric masses 60 and 62 are oriented so that the respective components of their centrifugal forces are additive in the direction of the boom 12, first in one direction and then in the other, while the lateral components of their centrifugal forces neutralize each other in the course of counter rotation of the respective gears. It follows that the boom 12 is induced to reciprocate back and forth as the eccentric masses 60 and 62 are rotated and that the frequency and intensity of the reciprocal motion is variable with the speed at which the gears 50 and 52 are driven.

The boom 12 is mounted on the carriage 14 by means of a supporting member 64 which is connected to the housing 38. The supporting member 64 is adapted to dissipate the reciprocal forces incident to operation of the boom 12. It is engaged to the housing 38 on the extended ends of the axis shaft 54. It is likewise pivotal on a shaft member 66 mounted within bearing members 68 and 70 provided on the carriage frame. The supporting member 64 is thus able to oscillate back and forth while the boom 12 is reciprocating and minimize the transfer of such forces to the carriage 14. Stops 71 and 73 are disposed to limit the extent of oscillation permitted the supporting member 64. This does not affect the freedom of location permitted the boom 12 in view of the pivotal connection between the supporting member 64 and housing 38.

As will be appreciated, and previously mentioned, the boom reciprocating mechanism 16 may be driven by a suitable power source. In the present instance a small gasoline engine 18 is mounted on the frame of the carriage 14 and includes a belt connection 72 between pulleys 74 and 76 which are provided on the output shaft 78 of the engine and extended end of the boom supporting shaft 66. A like belt connection 80 is provided between pulleys 82 and 84 provided on the shaft 66 and extended end of the gear shaft 54.

The carriage member 14 merely illustrates a simple conveyance for moving the harvesting boom 12 to any desired location. It includes a frame 86 on which the boom 12 and its related mechanism, as well as the gasoline engine 18, is mounted. Rear wheels 88 and 90 are provided on a straight axle 92 provided under the place where the boom is engaged to the carriage. A trunnion supported third wheel 94 is provided at the front end of the carriage for easy steering purposes.

Suitable wheel chocks 96 and 98 may be provided to lock the carriage in a selected position. As will be appreciated, such wheel chocks may be separate chock members, pivotally mounted on the carriage as shown and manually or otherwise positionable, or could be any form of wheel brake. Their principal purpose is to hold the carriage 14 in a selected position in any suitable means made to be used in this regard.

Additional stabilization of the carriage is obtained by a weight 100 provided somewhere over the steering wheel.

OPERATION

The harvesting device 10 is readily mobile to any selected location within an orchard. Thereafter, the boom 12 is elevated and turned as necessary for the claw 22 to be engaged to the limb of a selected tree. The jaw 24 of the claw 22 is adjusted to engage the tree limb to the end of the boom 12 by operation of the connecting link 32. Once secure engagement is obtained the clamp 34 is set.

After engagement has been made with the tree, the carriage 14 should be positioned so that the boom supporting link 64 is disposed vertically and is equally spaced between the stops 71 and 73.

After the carriage 14 has been located in the manner mentioned, the wheel chocks 96 and 98 are positioned to prevent the wheels from turning and, in effect, lock the carriage to the ground.

Subsequently, the engine 18 is started and the counter rotating spur gears 50 and 52 are activated. This, in turn, rotates the eccentric masses 60 and 62 and causes reciprocation of the boom 12. It will be appreciated that the mass of the boom as well as that of the eccentric masses 60 and 62 contribute to the effective reciprocation of the boom in shaking the tree limb. The resulting action is one which shakes the tree limb back and forth with sufficient force to cause any fruit on the limb which is ripe and ready for harvesting to be dislodged.

The counter rotating motion of the eccentric masses, as previously mentioned, while being oriented to reciprocate the boom 12 are also so disposed as to neutralize the centrifugal forces of each other which would normally cause lateral movement of the boom and a corresponding lift or shaking force being transferred to the carriage 14. Furthermore, the articulated connection of the boom 12 through the supporting member 64 affords a dissipation of the reciprocal forces which might likewise move the carriage back and forth.

It will be appreciated that the present invention has been disclosed in a basic form and that numerous modifications and improvements are foreseeable in production and other refinements. However, it is to be understood that the scope of this invention is not to be limited to the specific disclosure but is to be interpreted in the language of the hereinafter appended claims without restriction except as regards specific exclusions made therein.

I claim:

1. A harvesting device, comprising: a tree engaging member, respectively counter-rotating eccentric masses provided on said tree engaging member, drive means operatively connected to said masses, said masses being oriented with respect to each other and said tree engaging member for vibrational reciprocation of said tree engaging member and for counter-balancing each other laterally thereof, said counter-rotating eccentric masses having axes normal to the longitudinal axis of said tree engaging member, and said counter-rotating eccentric masses having parallel spaced axes laterally offset from the longitudinal axis of said tree engaging member.

2. The harvesting device of claim 1: said counter-rotating eccentric masses being disposed in coplanar relation and having their respective axes laterally offset on opposite sides of the longitudinal axis of said tree engaging member, said eccentric masses being relatively balanced to provide the boom reciprocating force along the axis of said boom.

3. The harvesting device of claim 2: said counter-rotating eccentric masses being in synchronous operative engagement and having said drive means engaged with one thereof.

4. A harvesting device, comprising: a tree engaging boom member, a pair of gear members disposed in coplanar relation and meshing engagement with the pitch point thereof coincident with the longitudinal axis of said boom member, drive means engaged to one of said gear members for respective counter rotation of the pair thereof, and eccentrically disposed masses provided on said gear members and relatively oriented for boom reciprocating alignment and lateral neutralization of the centrifugal forces incident to rotation thereof.

5. The harvesting device of claim 4, comprising: a carriage member having said boom member provided thereon, and an oscillatory link connecting said boom to said carriage member and disposed for dissipation of the reciprocative motion thereof to said carriage.

6. A harvesting device, comprising; a boom member having a tree engaging adjustable claw provided on the extended end thereof, a frame having means provided thereon for supporting said boom in selected angular positions thereover and beyond, a gear housing having said boom member connected thereto and being in turn connected to said supporting means, a pair of spur gears mounted in respectively said housing and in counter-revolving meshing engagement, said gears being of like diametral pitch and having the pitch point thereof coincident with the longitudinal axis of said boom member, eccentrically disposed masses provided on said gear members and relatively oriented with respect to each other and said boom member for boom reciprocating longitudinal summation and lateral neutralization of the centrifugal forces incident to rotation thereof, and drive means operatively engaged with one of said gears and synchronously operative of both thereof therethrough.

References Cited by the Examiner

UNITED STATES PATENTS

| | | | |
|---|---|---|---|
| 2,522,906 | 9/50 | Smith | 56—328 X |
| 2,922,268 | 1/60 | Prichard | 56—306 |
| 3,041,811 | 7/62 | Sides | 56—328 |
| 3,059,402 | 10/62 | Shipley | 56—328 |
| 3,121,304 | 2/64 | Herbst | 56—328 |

ANTONIO F. GUIDA, *Acting Primary Examiner.*

ARNOLD RUEGG, T. GRAHAM CRAVER,
*Examiners.*